(12) United States Patent
Oliver (10) Patent No.: US 7,647,997 B2
(45) Date of Patent: Jan. 19, 2010

(54) REGENERATION AND BRAKE MANAGEMENT SYSTEM

(75) Inventor: James L. Oliver, Orion, MI (US)

(73) Assignee: Eaton Corporation, Cleveland, OH (US)

( * ) Notice: Subject to any disclaimer, the term of this patent is extended or adjusted under 35 U.S.C. 154(b) by 29 days.

(21) Appl. No.: 11/649,548

(22) Filed: Jan. 4, 2007

(65) Prior Publication Data

US 2007/0107958 A1   May 17, 2007

Related U.S. Application Data

(62) Division of application No. 10/989,772, filed on Nov. 16, 2004, now Pat. No. 7,311,163.

(51) Int. Cl.
*B60K 6/00*  (2007.10)
(52) U.S. Cl. .............. 180/165; 180/65.275; 180/65.31; 180/65.21; 903/947; 701/22; 303/152
(58) Field of Classification Search .............. 180/65.2, 180/165; 903/947; 701/22; 303/152
See application file for complete search history.

(56) References Cited

U.S. PATENT DOCUMENTS

| | | | |
|---|---|---|---|
| 5,322,352 A | 6/1994 | Ohno et al. | |
| 5,378,053 A | 1/1995 | Patient et al. | |
| 5,433,282 A | 7/1995 | Moroto et al. | |
| 5,433,512 A * | 7/1995 | Aoki et al. | 303/3 |
| 5,615,933 A | 4/1997 | Kidston et al. | |
| 5,775,784 A | 7/1998 | Koga et al. | |
| 5,934,395 A | 8/1999 | Koide et al. | |
| 6,076,899 A | 6/2000 | Isella | |
| 6,170,587 B1 | 1/2001 | Bullock | |
| 6,176,808 B1 | 1/2001 | Brown et al. | |
| 6,202,776 B1 | 3/2001 | Masberg et al. | |
| 6,231,135 B1 * | 5/2001 | Bower et al. | 303/152 |
| 6,250,270 B1 | 6/2001 | Ahner et al. | |
| 6,275,763 B1 | 8/2001 | Lotito et al. | |
| 6,278,916 B1 | 8/2001 | Crombez | |
| 6,380,640 B1 | 4/2002 | Kanamori et al. | |
| 6,406,105 B1 | 6/2002 | Shimada et al. | |
| 6,412,882 B1 * | 7/2002 | Isono et al. | 303/114.1 |
| 6,454,364 B1 | 9/2002 | Niwa et al. | |
| 6,488,344 B2 * | 12/2002 | Huls et al. | 303/152 |
| 6,543,565 B1 | 4/2003 | Phillips et al. | |
| 6,655,754 B2 | 12/2003 | Crombez et al. | |
| 6,663,197 B2 | 12/2003 | Joyce | |
| 6,687,593 B1 | 2/2004 | Crombez et al. | |
| 6,959,971 B2 | 11/2005 | Tsunehara | |
| 2003/0184152 A1 * | 10/2003 | Cikanek et al. | 303/152 |
| 2003/0184153 A1 | 10/2003 | Worrel | |
| 2003/0234577 A1 | 12/2003 | Crombez et al. | |
| 2004/0070270 A1 | 4/2004 | Ganji | |

* cited by examiner

*Primary Examiner*—Paul N Dickson
*Assistant Examiner*—Jacob Meyer
(74) *Attorney, Agent, or Firm*—Rader, Fishman & Grauer PLLC (57) ABSTRACT

A regeneration and brake management system includes a prime mover, an energy storage device associated with the prime mover, and a regenerative braking system including a controller and at least one friction brake, wherein the regenerative braking system is configured to at least partially disable the at least one friction brake during regenerative braking.

23 Claims, 6 Drawing Sheets

REGENERATION AND BRAKE MANAGEMENT SYSTEM

RELATED APPLICATION

The present specification is a Divisional and claims priority under 35 U.S.C. § 121 of U.S. patent application Ser. No. 10/989,772 filed Nov. 16, 2004 titled "Regeneration and Brake Management System," which application is incorporated herein by reference in its entirety.

BACKGROUND

The present system and method relate generally to hybrid motor vehicles, and more particularly, to a brake management system adapted to regenerate a fuel source of a hybrid motor vehicle.

Automobile manufacturers are continuously working to improve fuel efficiency in motor vehicles. Improvements in fuel efficiency are typically directed toward reducing weight, improving aerodynamics, and reducing power losses through the vehicle powertrain. However, the need to improve fuel efficiency is commonly offset by the need to provide enhanced comfort and convenience to the vehicle operator. As an example, manually-shifted transmissions are more fuel efficient than automatic transmissions due to lower parasitic losses. The higher losses associated with conventional automatic transmissions originate in the torque converter, the plate clutches and the hydraulic pump used to control operation of the hydraulic shift system. However, a vast majority of domestic motor vehicles, for example, are equipped with automatic transmissions due to the increased operator convenience they provide. Recent advances in power-operated shift systems have allowed development of "automated" versions of manual transmissions, which automatically shift between sequential gear ratios without any input from the vehicle operator. Thus, automated manual transmissions provide the convenience of a traditional automatic transmission with the efficiency of a manual transmission.

Passenger vehicle and heavy truck manufacturers are also actively working to develop alternative powertrain systems in an effort to reduce the level of pollutants exhausted into the air by conventional powertrain systems equipped with internal combustion engines. Significant development efforts have been directed to electric and fuel-cell vehicles. Unfortunately, these alternative powertrain systems suffer from several disadvantages and, for all practical purposes, are still under development. However, "hybrid" electric vehicles, which include an internal combustion engine and an electric or hydraulic motor, offer a compromise between vehicles powered by traditional internal combustion engines and full electric-powered vehicles. These hybrid vehicles are equipped with an internal combustion engine and an electric or hydraulic motor that can be operated independently or in combination to provide motive power to the vehicle.

There are two types of hybrid vehicles, namely, series hybrid and parallel hybrid vehicles. In a series hybrid vehicle, power is delivered to the wheels by the electric motor, which draws electrical energy from a generator or a battery. The engine is used in series hybrid vehicles to drive a generator that supplies power directly to the electric motor or charges the battery when the state of charge falls below a predetermined value. In parallel hybrid vehicles, the electric motor and the engine can be operated independently or in combination pursuant to the running conditions of the vehicle.

Improving the efficiency of hybrid vehicles includes recouping energy spent by the electric motor. Generally, the control strategy for recouping energy spent by the electric motor involves operating the motor in a reverse operation causing it to function as a generator during braking operations. However, attempting to recover spent energy through regenerative braking presents a number of issues. First, it is not possible or practical to recover all the braking energy at gross weights, at high speeds, or at high deceleration rates because some braking energy has to be transferred to the brakes under these situations. However, it would be desirable to retrieve as much of the braking energy as practical. Second, the amount of energy retrieved and transferred during regenerative braking varies depending on many variables, some of which will change during vehicle operation, such as the amount of wind acting on the vehicle, absorber motor torque variations, temperature changes, age of the vehicle, grade of the terrain, weight transfers, rolling resistance, etc. Third, the requested amount of braking (deceleration) by the driver will vary and usually increase as the vehicle slows. Fourth, regeneration will unbalance two-wheel-drive brake systems and could cause unusual brake and tire wear. Attempting to obtain the maximum amount of energy through regeneration generally unbalances the brake system of a two-wheel drive vehicle because regeneration provides a negative torque on the drive wheels, in addition to the braking force applied by the braking system. During regenerative braking, the non-drive wheels spin freely, only being acted upon by the braking system. This uneven application of negative torque between the drive and non-drive wheels results in a potential for skidding the drive wheels, thus causing uneven tire wear and brake wear. Accordingly, there exists a need for improved regenerative brake control systems for use in hybrid vehicles that facilitate an efficient, yet safe regeneration of energy.

SUMMARY

A regeneration and brake management system includes a prime mover, an energy storage device associated with the prime mover, and a regenerative braking system including a controller and at least one friction brake, wherein the regenerative braking system is configured to at least partially disable the at least one friction brake during regenerative braking.

According to one exemplary embodiment, the above-mentioned regeneration and brake management system is applied to a hybrid powertrain system. When applied to a powertrain system, the present system is configured to maximize the amount of energy accumulated through regenerative braking by at least partially disabling the friction brakes when sufficient deceleration may be obtained through regenerative braking. Further, the present system reduces drive wheel skidding, and uneven tire and brake wear.

Additionally, an exemplary method for operating a regenerative powertrain system includes providing a prime mover, an energy storage device associated with the prime mover, a regenerative braking system including a controller and at least one friction brake, and at least partially disabling the at least one friction brake during regenerative braking.

BRIEF DESCRIPTION OF THE DRAWINGS

Embodiments of the present system and method will now be described, by way of example, with reference to the accompanying drawings, wherein.

Throughout the drawings, identical reference numbers designate similar, but not necessarily identical, elements.

DETAILED DESCRIPTION

The present system and method provide an integral anti-skid, hydraulic brake pressure intensifier, and regenerative control system. More specifically, the present system and method are configured to maximize the amount of energy accumulated through regenerative braking by at least partially disabling the friction brakes when sufficient deceleration may be obtained through regenerative braking. Consequently, regeneration of energy is maximized while providing a requested amount of deceleration to the vehicle. Additionally, the anti-skid functions of the vehicle are enhanced by a controller that manages and distributes the maximum available and acceptable kinetic energy to the storage batteries and distributes the excess energy to the appropriate friction brakes. By predicting and monitoring regenerator torque based on current, combined with the driver's pedal input request and wheel speed information detection, regeneration is maximized without causing vehicle operating problems, such as wheel slippage, imbalance that can cause drive wheel skidding, or uneven tire and brake wear.

Figure 1:
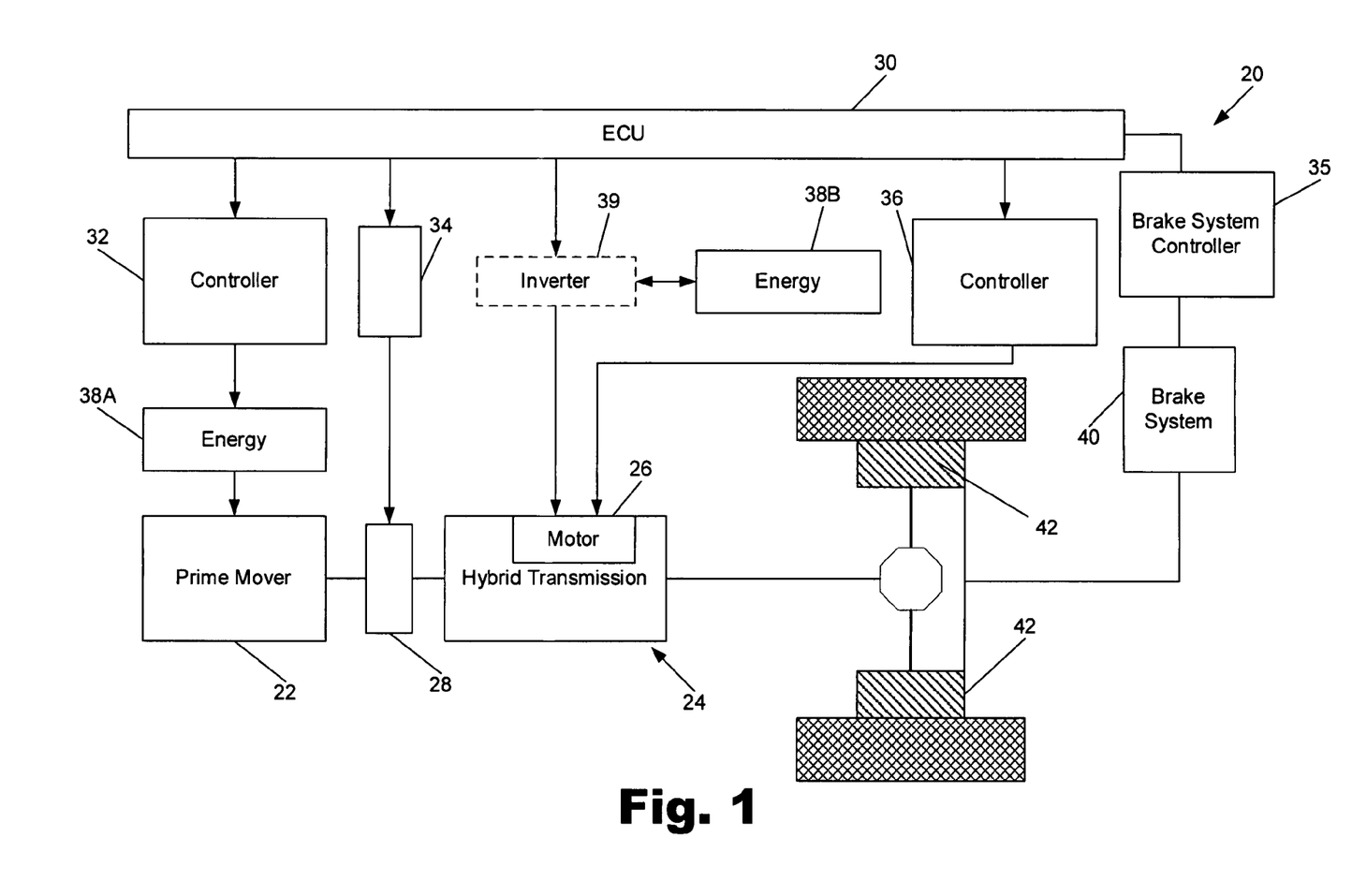
FIG. 1 is a schematic view of an exemplary hybrid powertrain system for a motor vehicle.

Referring now to FIG. 1, a hybrid powertrain system (20) configured to be associated with a hybrid vehicle is shown in accordance with an embodiment of the present system and method. In the illustrated embodiment, powertrain system (20) includes a first prime mover (22), such as a spark-ignited or compression-ignited internal combustion engine, and a hybrid transmission (24) that includes a second prime mover in the form of a motor (26), such as an electric motor/generator or hydraulic motor/pump. A main synchronizing clutch (28) is positioned between first prime mover (22) and hybrid transmission (24) to selectively engage and disengage the first prime mover (22) from the hybrid transmission (24). The main synchronizing clutch (28) may be any number of clutches currently known in the art such as a hydraulically or electrically operated friction clutch.

Additionally, as illustrated in FIG. 1, the hybrid powertrain system (20) includes a brake system (40) having at least one friction brake (42) associated with each wheel of a hybrid vehicle. The friction brakes (42) may be any type of friction braking mechanism including, but in no way limited to, hydraulically actuated brakes, electrically actuated brakes, mechanically actuated brakes, disk brakes, drum brakes, anti-lock brakes, or any other device or combination of devices used to selectively reduce the kinetic energy associated with a moving vehicle. Further details of the brake system (40) will be given below with reference to FIG. 2.

Continuing with reference to FIG. 1, the powertrain system (20) may include an electronic control unit (ECU) (30) for controlling operation of first prime mover (22), main clutch (28), brake system (40), and hybrid transmission (24). In a particular configuration, the ECU (30) includes a programmable digital computer that is configured to receive various input signals, including without limitation, the operating speeds of the first and second prime movers (22, 26), the transmission input speed, the selected transmission ratio, the transmission output speed, vehicle speed, and the friction brake actuation commands. Once received, the ECU (30) processes the signals according to logic rules to control operation of the powertrain system (20). For example, the ECU (30) may be programmed to deliver fuel to the first prime mover (22) when it functions as an internal combustion engine. To support this control, each of the first prime mover (22), the main clutch (28), the brake system (40), and the hybrid transmission (24) may include its own controller (32, 34, 35, 36) respectively. According to one exemplary embodiment, the brake system controller (35) is a brake management regeneration anti-skid controller configured to implement the present system and method as explained in detail below with reference to FIGS. 3 and 4. However, it will be appreciated that the present system and method are not limited to any particular type or configuration of ECU (30), controllers (32, 34, 35, 36), or to any specific control logic for governing operation of the hybrid powertrain system (20).

In the exemplary embodiment illustrated in FIG. 1, the powertrain system (20) also includes at least one energy storage device (38A, 38B) for providing energy to operate the first and second prime movers (22, 26). For example, an energy storage device (38A) that is in fluid communication with the first prime mover (22) may contain a hydrocarbon fuel when the first prime mover (22) functions as an internal combustion engine. In another example, the energy storage device (38B) may include a battery, a bank of batteries, or a capacitor when the second prime mover (26) functions as an electric motor/generator. When so configured, the electric motor/generator may be provided in electrical communication with the electrical storage device (38B) through a drive inverter (39), as is known in the art. Alternatively, the energy storage device (38B) may function as a hydraulic accumulator when the second prime mover (26) functions as a hydraulic motor/pump. In the hybrid transmission (24) illustrated in FIG. 1, negative torque may be used to drive rotation of the second prime mover or motor (26), operating as a generator or a pump, to create and store energy in the energy storage device (38B). Moreover, engine braking may be emulated, which may be desirable even if energy storage device (38B) is at capacity. For ease of explanation only, the present system and method will be described hereafter in the context of a second prime mover or motor (26) that may function as a generator. However, it will be appreciated that the present system and method may also be applied to a hydraulically driven motor configured to operate as a pump.

Figure 2:
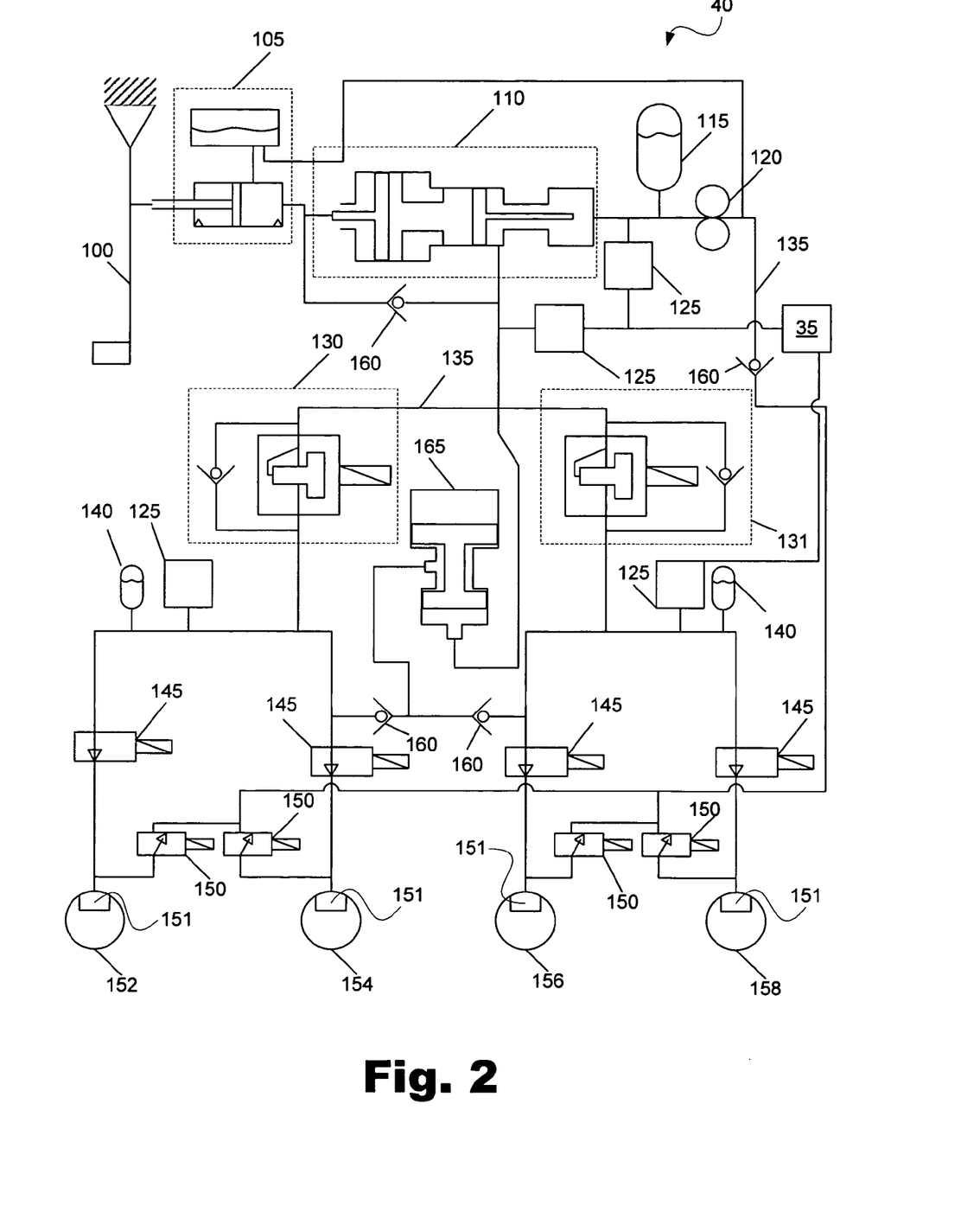
FIG. 2 is a schematic view of an exemplary regenerative braking system adapted for use in the hybrid powertrain system shown in FIG. 1.

With reference to FIG. 2 of the accompanying drawings, the components and method of the exemplary brake system (40) will now be described in detail. According to one exemplary embodiment illustrated in FIG. 2, the exemplary brake system (40) includes a brake pedal (100) that is mechanically coupled to a master cylinder (105), including a fluid reservoir. As a vehicle operator maneuvers the vehicle, desired deceleration is input to the exemplary brake system (40) by actuation of the brake pedal (100). Pressure generated by actuation of the pedal (100) is transferred to the master cylinder (105) where it is converted from a mechanical motion to a hydraulic pressure. This hydraulic pressure is further applied to an intensifier (110) that amplifies the hydraulic pressure generated by the master cylinder (105) as it is applied to the brake line (135). Reliable amplification of the hydraulic pressure by the intensifier (110) is performed with the aid of a charge pump (120) and a fluid accumulator (115), as is currently known in the art.

As illustrated in the exemplary embodiment of FIG. 2, the brake lines (135) exit the intensifier (110) and lead to a front and rear proportion valve (130, 131) respectively. The proportioning valves (130, 131) regulate the hydraulic pressure that is eventually transferred to the friction brakes (152-158). Regardless of the type of friction brakes the hybrid vehicle possesses, the rear brakes (156, 158) generally require less force than the front brakes (152, 154). In other words, the amount of brake force that can be applied to a wheel without overcoming the rolling friction depends, at least in part, on the amount of weight on the wheel. Higher weight means more brake force can be applied to reduce the kinetic energy without locking the wheel up. The front brakes (152, 154) generally support a majority of the weight of at least the first prime mover (22) and the hybrid transmission (24), and consequently demand higher braking force or pressure. As a result, a front-wheel driven vehicle will have the potential to regenerate more energy than a rear-wheel driven vehicle. Consequently, the present exemplary embodiment will be described in the context of a front-wheel driven vehicle having a hybrid powertrain system (20). However, the present system and method may be applied to any vehicle incorporating a hybrid powertrain system (20).

Continuing with the brake system (40) illustrated in FIG. 2, the front and rear proportion valves (130, 131) each transmit a pressurized fluid to the inlet valves (145) of the friction brakes (152-158) with a shock damper (140) therebetween. As the pressurized fluid is selectively passed through the brake inlet valves (145), it acts upon the friction element (not shown) of the friction brakes (152-158), thereby actuating the brakes and reducing the kinetic energy of the vehicle. The kinetic energy of the vehicle is reduced at a rate proportional to the pressure of the pressurized fluid acting upon the friction element of the brakes (152-158). The inlet valves (145) maintain the pressure of the pressurized fluid against the brakes (152-158) until pressure in the brake lines (135) is reduced. Once pressure in the brake lines (135) is reduced, the brake outlet valves (150) are actuated allowing the pressurized fluid to be exhausted and flow through a return path of the brake lines (135) to the charge pump (120) where the fluid may be reused in the brake system (40). When the pressurized fluid is exhausted from against the brakes (152-158), the braking pressure on the brakes (152-158) is reduced or eliminated.

FIG. 2 also illustrates a number of one-way valves (160) and an accumulator (165) disposed in the brake system (40). As shown, the one-way valves (160) are oriented to permit the flow of a high pressurized fluid to a lower pressurized fluid in a first direction when a pressure differential exists in the brake lines (135). However, in a second direction, the one-way valves (160) are configured to prevent such a flow. Consequently, the one-way valves (160) provide a stabilization of the pressurized fluid in one direction while maintaining a high pressure accumulation in a second direction. Similarly, the accumulator (165) disposed in the brake system (40) is coupled to the output of the intensifier (110) and the input of the brake inlet valves (145) through a number of one-way valves (160). As illustrated, the accumulator (165) and the one-way valves (160) regulate a minimum pressure at the brake inlet valves (145) by allowing a flow of pressurized fluid to the brake inlet valves when the pressurized fluid provided by the proportioning valves (130, 131) drops below the pressure output by the accumulator.

Additionally, as illustrated in FIG. 2, the exemplary brake system (40) includes wheel speed pick-ups (151) and a number of pressure transducers (125) selectively placed in fluid communication with the brake lines. The pressure transducers (125) are configured to monitor the hydraulic pressure present in various portions of the brake lines (135) and relay the resulting pressure measurements to the brake system controller (35). Similarly, the wheel speed pick-ups (151) are configured to monitor the velocity of the vehicle wheels and convert the measured velocities to a corresponding electrical signal that may then be transferred to the brake system controller (35; FIG. 1) or the ECU (30; FIG. 1). The brake system controller (35; FIG. 1) or the ECU (30; FIG. 1) may then use the received measurements collected by the pressure transducers (125) and the wheel speed pick-ups (151) to further control the fluid pressure regulating components of the brake system (40). Further details of the control executed by the brake system controller (35; FIG. 1) or the ECU (30; FIG. 1) will be described below with reference to FIGS. 3 and 4.

Figure 3:
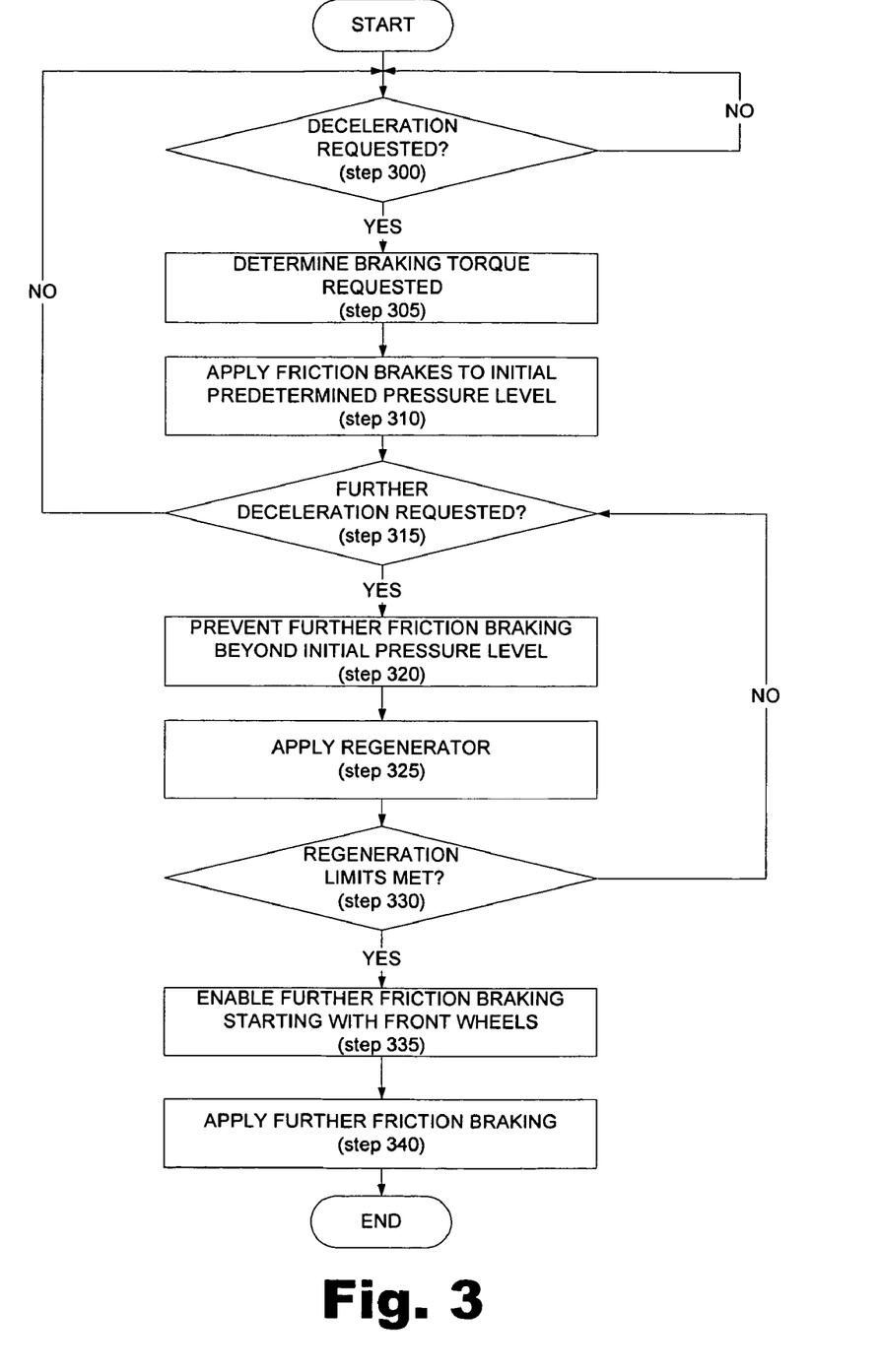
FIG. 3 is a flowchart illustrating an exemplary method for maximizing regeneration in a braking system according to one exemplary embodiment.
Figure 4:
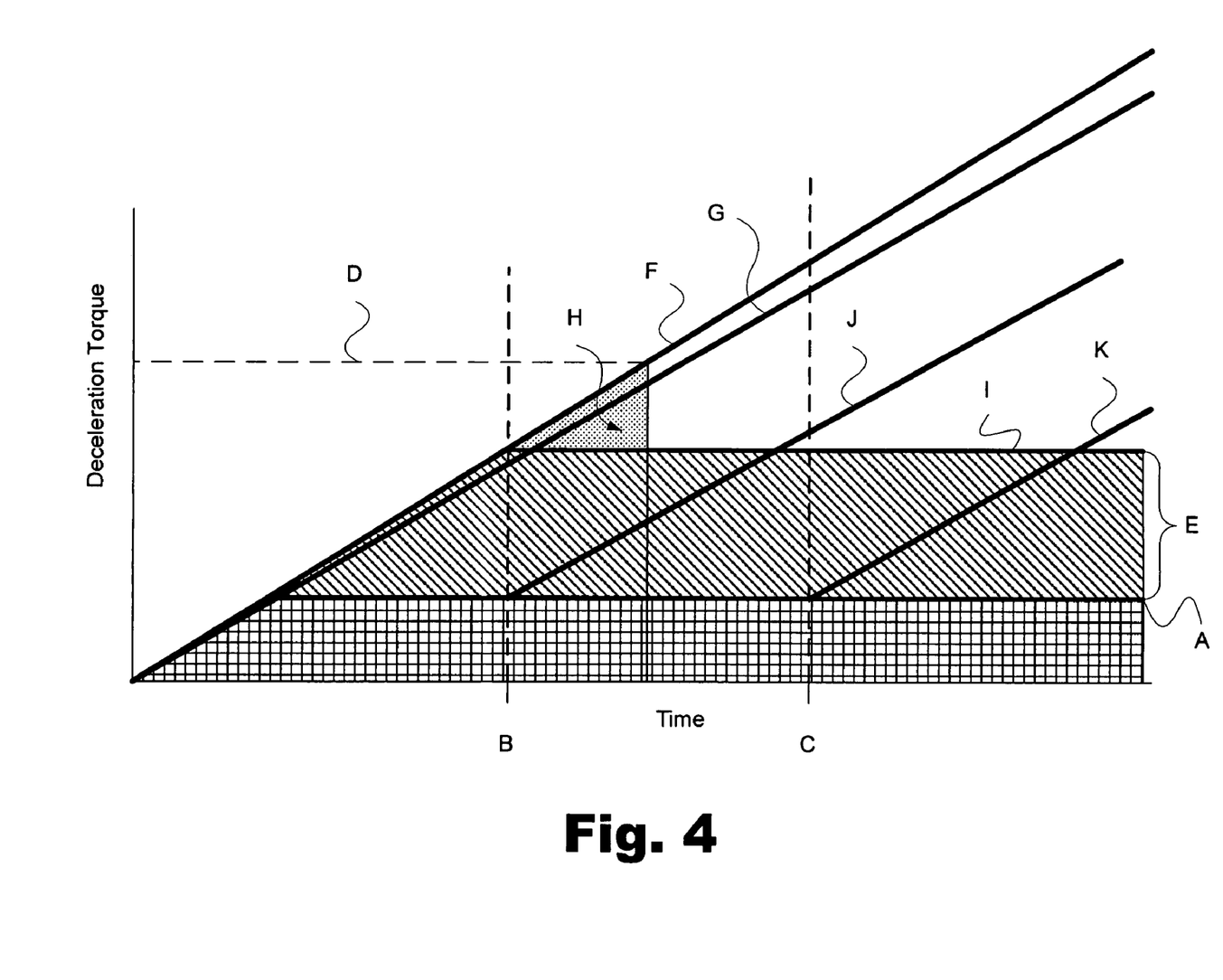
FIG. 4 is a graphical representation of a hybrid powertrain regeneration operation according to one exemplary embodiment thereof.

As illustrated in FIGS. 3 and 4, the present exemplary method begins by first determining whether a deceleration has been requested (step 300). According to one exemplary embodiment, throttle pedal (100; FIG. 2) position may be used as pre-indicator of an opportunity for deceleration, and thus, regeneration. Additionally, a request for deceleration and regeneration may be indicated by an increase in the fluid pressure of the brake system (40), as detected by any of the pressure transducers (125), or by activation of a brake light system.

Once a deceleration has been requested (YES, step 300) and detected by the brake system controller (35; FIG. 1), the ECU (30; FIG. 1) or the brake system controller determines the deceleration torque requested (step 305) by the vehicle operator. According to the present exemplary embodiment, the pressure transducers (125; FIG. 2) may be used to determine the deceleration torque requested from the user by correlating the pressure generated in the braking system (40; FIG. 2) with a desired deceleration torque. Additionally, according to another exemplary embodiment, the deceleration torque requested is determined from an analysis of the amount of force exerted by the vehicle operator on the brake pedal (100; FIG. 2).

As illustrated in FIG. 4, line F represents an exemplary hydraulic pressure generated by a vehicle operator. The pressure generated by a vehicle operator's actuation of the brake pedal (100; FIG. 2) may vary anywhere from zero to over 2000 psi. As mentioned previously, the braking or deceleration torque requested is then determined by the brake system controller (35; FIG. 2) or the ECU (30; FIG. 2) from the hydraulic pressure generated, as represented in FIG. 4 by line G. According to the exemplary embodiment illustrated in FIG. 4, the deceleration torque requested (G), when applied to the wheels, will produce a desired level of deceleration (D). The deceleration torque used to produce the desired level of deceleration (D) may come from any combination of regeneration braking, rolling resistance, wind resistance, front friction brake application, and/or rear friction brake application. As will be described below, the exemplary method illustrated in FIG. 3 manages the allocation of the desired level of deceleration between various braking sources to maximize the amount of energy produced through braking regeneration.

Returning again to FIG. 3, once the requested deceleration torque is determined (step 305), the braking system (40; FIG. 2) applies the friction brakes to an initial predetermined pressure level (step 310). Line A of FIG. 4 represents the deceleration torque provided by an initial predetermined pressure level that acts on a portion of the wheels of a vehicle when the brakes are applied, according to the illustrated embodiment. The brakes (152-158; FIG. 2) are applied to an initial predetermined pressure level to ensure that all the clearances between the friction causing device, such as a brake pad, and a portion of the vehicle wheel, such as a disk or drum are removed in preparation for further application. The predetermined pressure level of the brakes (152-158; FIG. 2) may vary, based on a number of factors including, but in no way limited to, weight of the vehicle, operating speed of the vehicle, etc.

After the initial application of the friction brakes (step 310) is performed, the ECU (30) or braking system controller (35) determines whether further deceleration is requested, in excess of the deceleration provided by the initial application of the friction brakes, to achieve the desired level of deceleration (step 315). If the initial application of the friction brakes is sufficient to achieve the desired level of deceleration and no further braking is desired (NO, step 315), the braking system (40) continues to monitor for further deceleration requests (step 300).

If, however, deceleration in excess of the predetermined pressure value is requested (YES, step 315), the ECU (30; FIG. 1) and/or braking system controller (35; FIG. 1) prevents further friction braking (step 320) and the regenerator is applied (step 325). As shown in FIG. 4, the initial deceleration torque (A) generated when the brakes (152-158; FIG. 2) are initially applied to a predetermined pressure level is not sufficient to achieve the desired level of deceleration (D). Consequently, a quantity of deceleration over time is provided through regeneration as illustrated by the area E in FIG. 4. According to the present exemplary embodiment, further friction braking by the brakes (152-158; FIG. 2) beyond the initial predetermined pressure level represented by line A is prevented to maximize the amount of energy obtained through regenerative braking.

As mentioned previously, application of the regenerator includes, referring to FIG. 1, disengaging the main synchronizing clutch (28) to decouple the first prime mover (22) from the hybrid transmission (24). Once the first prime mover (22) is decoupled from the hybrid transmission (24), the second prime mover (26) is operated as an electric generator. When so configured, the electric generator is provided in electrical communication with the electrical storage device (38B) through a drive inverter (39). When the regeneration process is initiated, further deceleration is provided to the vehicle as negative torque that is then used to drive rotation of the second prime mover (26), operating as a generator or a pump, to create and store energy in the energy storage device (38B). Driving the rotation of the second prime mover (26) with negative torque of the hybrid transmission effectively reduces the speed of the vehicle without wasting the kinetic energy in the brakes (152-158).

Returning again to FIGS. 3 and 4, the ECU (30; FIG. 1) or braking system controller (35; FIG. 1) determines, during the regeneration process, whether the system regeneration limits have been met (step 330). The determination of whether the system regeneration limits have been met (step 330) is based, according to one exemplary embodiment, on the inputs received from the pressure transducers (125; FIG. 2), the wheel speed pick-ups (151; FIG. 2), and/or the energy storage device (38B; FIG. 1). As used in the present specification, the term "system regeneration limits" is meant to be understood as including any condition that demands reduction or elimination of the regenerative braking including, but in no way limited to, filling of the energy storage device (38B; FIG. 1) to capacity, approaching traction limits of the driven wheels, and the like.

According to one exemplary embodiment, the ECU (30; FIG. 1) and/or braking system controller (35; FIG. 1) determines whether the regeneration limits are met (step 330) while factoring in system inputs that may vary during operation, and consequently, may vary whether conditions such as traction limits of the driven wheels are met. System inputs that may be considered by the ECU (30; FIG. 1) and/or braking system controller (35; FIG. 1) include, but are in no way limited to, grade, rolling resistance, surface condition changes, weight distributions and variances, absorbing generator torque variations, and requested deceleration rates. According to the present system and method, the system inputs are automatically sensed and transferred to the ECU (30; FIG. 1) and/or braking system controller (35; FIG. 1). The ECU (30; FIG. 1) and/or braking system controller (35; FIG. 1) then compensate for changes in the system inputs with the regenerative braking to maintain brake balance between the wheels and prevent skidding conditions, such that the compensations are undetectable by the vehicle operator.

As illustrated in FIG. 4, the amount of deceleration torque provided over time by the regenerative braking is represented by the area E. Further, line I represents the maximum deceleration torque obtainable per unit of time from regenerative braking in combination with the initial predetermined pressure level represented by line A without exceeding the system regeneration limits, according to the present exemplary embodiment. When the regenerative braking has been engaged, a balance is maintained between maximizing the energy generated from regenerative braking and decelerating the vehicle.

If the requested level of deceleration (D) has not been achieved and the system regeneration limits have not yet been met (NO, step 330), the ECU (30; FIG. 1) and/or braking system controller (35; FIG. 1) returns to a previous state and awaits further deceleration requests (step 315) so that the regeneration may be further applied (step 325). According to the present exemplary embodiment, the friction brakes continue to be maintained at the initial predetermined pressure level represented by area A to prevent further deceleration by the friction brakes. This control method gives priority to regenerative braking to avoid wasting kinetic energy. More specifically, the friction brakes (152-158; FIG. 1) are disabled from further application until the system regeneration limits have been met.

If, however, the ECU (30; FIG. 1) or braking system controller (35; FIG. 1) determines that the regeneration limits of the hybrid powertrain system (20; FIG. 1) have been met (YES, step 330), the ECU (30; FIG. 1) or braking system controller (35; FIG. 1) enables further friction braking, starting with braking of the driven or front-wheel brakes first (step 335) followed by application of the rear wheel or non-driven brakes (step 340).

Returning again to FIG. 4, line B illustrates the point in time when pressure begins to be applied to the driven or front wheel brakes (152, 154; FIG. 2), providing deceleration to the vehicle in addition to the deceleration provided by the regenerative braking, represented by area E. As shown, line J illustrates a deceleration torque provided when pressure is applied to the driven or front wheel brakes (152, 154; FIG. 2). Similarly, line C illustrates the point in time when pressure is also applied to the rear wheel or non-driven brakes (156, 158; FIG. 2). Line K illustrates a deceleration torque provided over time when pressure is applied to the rear wheel or non-driven brakes (156, 158; FIG. 2). As mentioned previously, the point of operation when the regeneration limits have been met may vary depending on a number of system inputs. That is, points B and C of FIG. 4 can occur anytime after the friction brakes have been set to the initial predetermined pressure level as represented by line A, or they may not occur at all, depending on brake requests, vehicle weight, surface condition and many other variable system inputs. Once the level of maximum deceleration torque available per unit time from regenerative braking (I) has been met, whether it be because the energy storage device (38B; FIG. 1) is filled to capacity or the regeneration torque exceeds the available traction of one or more of the wheels, further energy will then be absorbed by the friction brakes (152-158; FIG. 2). As illustrated in FIG. 4, a quantity of deceleration per unit time, as illustrated as area (H), is provided by application of the front wheel brakes (152, 154; FIG. 2) to achieve the requested level of deceleration (D).

Point C illustrates a point in time when the non-driven rear wheel brakes (156, 158; FIG. 2) begin to engage and aid in decelerating the vehicle by providing the deceleration torque represented by line K, according to the present exemplary embodiment. Engagement of the rear wheel brakes (156, 158; FIG. 2) will occur when the ECU (30; FIG. 1) or braking system controller (35; FIG. 1) detects that maximum regeneration current (I) is achieved and no rear wheel slippage is occurring, the thermal limit of the braking system (40; FIG. 1) is being exceeded, the energy storage device (38B; FIG. 1) cannot accept any more energy, the front brakes are being applied, and yet the vehicle operator is requesting still a higher level of braking. As illustrated in FIG. 4, the front brakes (152, 154; FIG. 2) and the rear brakes (156, 158; FIG. 2) may be selectively applied to provide additional deceleration while maintaining wheel balance.

Figure 5:
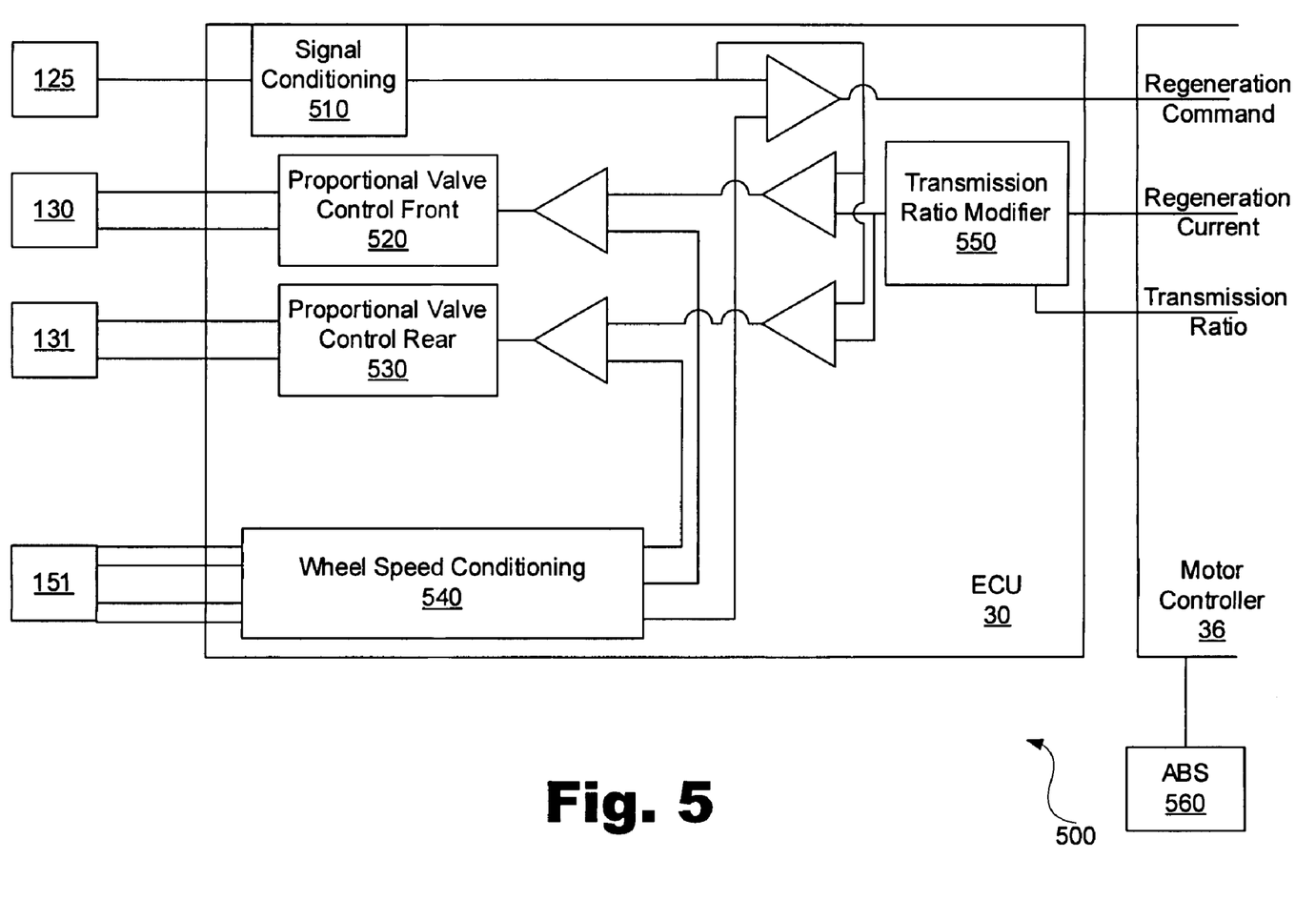
FIG. 5 is a simple schematic diagram illustrating a control system for implementing the method of FIG. 3 according to one exemplary embodiment thereof.
Figure 6:
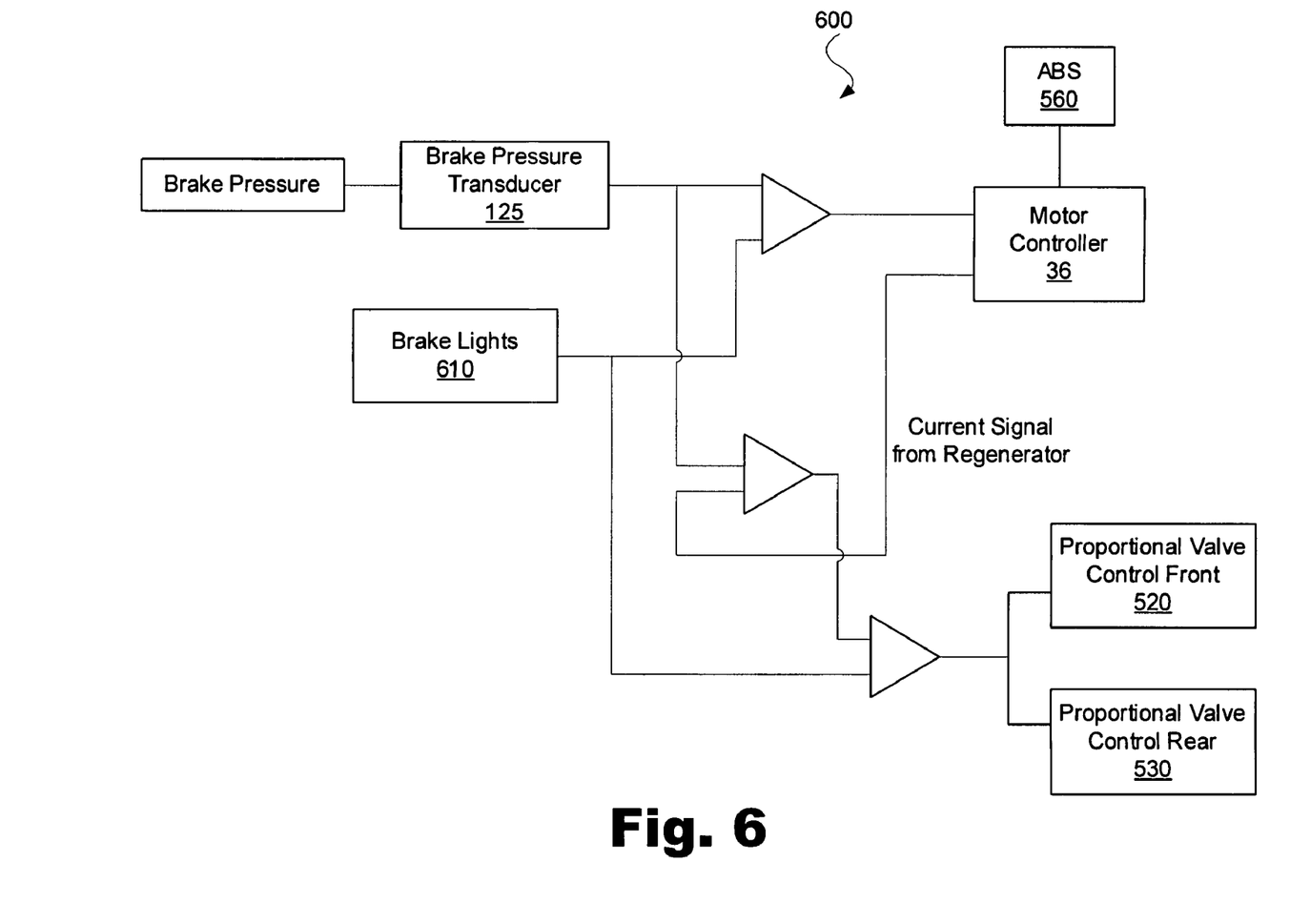
FIG. 6 is a simple schematic diagram illustrating a control system for implementing the method of FIG. 3 according to one exemplary embodiment.

FIGS. 5 and 6 illustrate a number of exemplary control systems configured to implement the above-mentioned method according to various levels of complexity. FIG. 5 is a simple schematic diagram illustrating a control system (500) for implementing the method of FIG. 3, according to one exemplary embodiment. As illustrated in FIG. 5, the ECU (30) includes a plurality of control modules and signal modifying units that perform the exemplary method of FIG. 3. As shown, system monitoring signals may be generated by the pressure transducers (125) and received by a signal conditioning unit (510), which converts the pressure transducer signals into control signals. Similarly, the wheel speed pick-up units (151) generate wheel velocity monitoring signals, which are received by a wheel speed conditioning module (540) and used to generate control signals. As illustrated, the output of both the pressure signal conditioning unit (510) and the wheel speed conditioning unit (540) are combined and used to generate the regeneration command that is transmitted to the motor controller (36), as discussed previously.

Continuing with reference to FIG. 5, the motor controller (36) provides regenerator current and transmission ratio signals to the transmission ratio modifier module (550) to allow for a determination of proper friction braking based on the amount of regeneration braking performed and the condition of the variable system inputs, as previously mentioned. Once a friction braking determination is made, based on system conditions, the braking control signal is combined with both the conditioned pressure transducer signal and the conditioned wheel speed signal and provided to proportional valve control modules (520, 530) for the front (130) and rear (131) proportion valves respectively to allow for balancing of the driven and non-driven wheels. Accordingly, the ECU (30) provides for the maximization of regenerative braking, based on the pressure transducer signals and the wheel speed signals, prior to the operation of the friction brakes (152-158; FIG. 2), as previously mentioned. Additionally, according to one exemplary embodiment, the front (130) and rear (131) proportion valves are configured to open at a nominal pressure of perhaps 300 PSI to ensure brake availability in the event of an electrical failure.

Further, as illustrated in FIG. 5, the motor controller (36) is coupled to an anti-lock braking system (ABS) (560). According to the present exemplary embodiment, the motor controller (36) is configured to recognize requested deceleration rates that would suggest a loss of traction. Accordingly, if the rear wheels of the hybrid vehicle lose traction, the ABS (560) will reduce the regeneration torque, and if additional braking is requested, the friction brakes (152-158; FIG. 2) will be applied and blended in with the pedal application pressure which is being determined and controlled by the vehicle operator. If wheel traction is still lost, the ABS (560) will operate normally as is well known in the art. By retaining the functionality of the standard ABS (560), the regenerative braking may be maximized until the ABS determines that the wheels are likely to lose traction.

Similarly, FIG. 6 illustrates an alternative control system (600) configured to modulate friction brake application pressures in response to a regenerative braking current. In contrast to the control system illustrated in FIG. 5, the control system configuration (600) shown in FIG. 6 does not provide pressure and/or wheel speed signals to the proportion valves (520, 530) in an attempt to balance the application of the friction brakes (152-158; FIG. 2). Rather, the regeneration system is applied and controlled by brake pressure as sensed by the brake pressure transducers (125; FIG. 2). According to the exemplary control system configuration (600), the friction brakes (152, 158; FIG. 2) are disabled, as mentioned above, as long as the regenerative braking system can provide the desired deceleration (braking) range requested by the vehicle operator, and provided that the wheels do not break traction as detected by the ABS system. According to the exemplary control system configuration (600) illustrated in FIG. 6, brake light signals (610), combined with brake pressure transducer (125) signals are used to trigger a deceleration request. Once deceleration is requested, the motor controller (36) performs regenerative braking while disabling the friction brakes (152-158; FIG. 2), according to the previously mentioned method, until the regeneration limits have been met and additional friction braking is desired. Once the regeneration limits have been met, a signal is transmitted to the proportional valve control units (520, 530) to control further actuation of the friction brakes (152-158; FIG. 2).

While the features of the present system and method are particularly suited for electrically powered motors, it is possible to apply the present systems and methods to regenerate air systems, hydraulic systems, or mechanical systems. Additionally, while the present system and method were described above in the context of a front-wheel drive vehicle, the present systems and methods may be applied to vehicles having any number of drive configurations that fully or partially disable friction braking to maximize regenerative braking including, but in no way limited to a rear-wheel drive or a four-wheel drive vehicle.

In conclusion, the present system and method maximize the amount of energy accumulated through regenerative braking by preventing friction brake application in excess of an initial predetermined application level when sufficient deceleration may be obtained through regenerative braking. Regenerative braking energy is maximized while providing a requested amount of deceleration to the vehicle without causing vehicle operating problems, such as wheel slippage, imbalance that can cause drive wheel skidding, or uneven tire and brake wear.

The present exemplary system and method have been particularly shown and described with reference to the foregoing embodiments, which are merely illustrative of the best modes presently established for carrying out the system and method. It should be understood by those skilled in the art that various alternatives to the embodiments of the system and method described herein may be employed in practicing the system and/or method, without departing from the spirit and scope thereof as defined in the following claims. It is intended that the following claims define the scope of the system and method and that the systems and methods within the scope of these claims and their equivalents be covered thereby. This description of the system and method should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A vehicular hybrid powertrain system comprising:
    a first prime mover;
    a second prime mover;
    an energy storage device associated with said second prime mover; and
    a regenerative braking system including a controller and friction brakes associated with said powertrain system, wherein said regenerative braking system is configured to at least partially disable said friction brakes during regenerative braking; and
    wherein said controller is configured to engage said friction brakes to an initial non-zero pressure level prior to regenerative braking and maintaining said friction brakes at a pressure level at least equal to said initial non-zero pressure level during regenerative braking.

2. The vehicular hybrid powertrain system of claim 1, wherein said second prime mover comprises an electric motor and an inverter associated with said electric motor, and wherein said regenerative braking comprises providing negative torque to said electric motor operating as a generator.

3. The vehicular hybrid powertrain system of claim 2, wherein said second prime mover comprises a hydraulic motor.

4. The vehicular hybrid powertrain system of claim 1, further comprising:
    a multi-ratio transmission including an input; and
    a clutch configured to selectively couple said first prime mover to said multi-ratio transmission, said clutch being configured to un-couple said first prime mover from said multi-ratio transmission during regenerative braking.

5. The vehicular hybrid powertrain system of claim 1, wherein said controller is further configured to:
    disable further friction braking until a limit of said regenerative braking system is met; said regenerative braking system being configured to produce a regenerative current during operation.

6. The vehicular hybrid powertrain system of claim 5, wherein said limit of said regenerative braking system comprises one of an energy storage device operating at capacity, a thermal limit of said regenerative braking system, or a wheel slippage.

7. The vehicular hybrid powertrain system of claim 5 wherein said limit of said regenerative braking system is varied based on one of a grade rolling resistance, a surface condition change, a weight distribution and variance, an absorbing generator torque variation, or a requested deceleration rate.

8. The vehicular hybrid powertrain system of claim 5, wherein said limit of said regenerative braking system is determined from a regenerative braking current.

9. The vehicular hybrid powertrain system of claim 6, further comprising:
    a pressure transducer configured to detect a fluid pressure in said regenerative braking system;
    a wheel speed pick-up unit configured to sense a rotational velocity of a vehicle wheel; and
    wherein said limit of said regenerative braking system is determined from said regenerative current, a detected fluid pressure, and a sensed wheel velocity.

10. The vehicular hybrid powertrain system of claim 1, further comprising a proportional valve disposed in said regenerative brake system configured to selectively apply an actuating brake fluid to said friction brakes; and
    wherein said at least partial disabling of said friction brakes comprises limiting a fluid pressure passed through said brake system proportional valve.

11. The vehicular hybrid powertrain system of claim 1, wherein said regenerative braking system is configured to enable friction braking when a regenerative limit of said regenerative braking system is met.

12. The vehicular hybrid powertrain system of claim 11, wherein said controller is configured to balance said enablement of the friction braking.

13. The vehicular hybrid powertrain system of claim 12, wherein said balancing comprises enabling a friction braking of a set of front wheels on a front-wheel driven vehicle.

14. The vehicular hybrid powertrain system of claim 1, wherein said controller is configured to at least partially disable said friction brakes and to initiate regenerative braking in response to one of an increased brake fluid pressure, an electrical brake light signal, or a throttle pedal.

15. A vehicular hybrid powertrain system comprising:
    a first prime mover including an internal combustion engine;
    a second prime mover including an electric motor and an inverter;
    an energy storage device associated with said second prime mover;
    a multi-ratio transmission including an input;
    a regenerative braking system including a controller and friction brakes associated with said powertrain system, and wherein said regenerative braking system is configured to at least partially disable said friction brakes during regenerative braking, wherein said regenerative braking comprises providing negative torque to said electric motor operating as a generator; and
    a clutch configured to selectively couple said first prime mover to said multi-ratio transmission, said clutch being configured to un-couple said first prime mover from said multi-ratio transmission during said regenerative braking; and
    wherein said controller is configured to engage said friction brakes to an initial non-zero pressure level prior to regenerative braking and maintaining said friction brakes at a pressure level at least equal to said initial non-zero pressure level during regenerative braking.

16. The vehicular hybrid powertrain system of claim 15, wherein said controller is further configured to:

disable further friction braking until a limit of said regenerative braking system is met; said regenerative braking system being configured to produce a regenerative current during operation;

wherein said limit of said regenerative braking system comprises one of an energy storage device operating at capacity, a thermal limit of said regenerative braking system, or a wheel slippage.

17. The vehicular hybrid powertrain system of claim 16, wherein said limit of said regenerative braking system is varied based on one of a grade rolling resistance, a surface condition change, a weight distribution and variance, an absorbing generator torque variation, or a requested deceleration rate.

18. The vehicular hybrid powertrain system of claim 16, further comprising: a pressure transducer configured to detect a fluid pressure in said regenerative braking system; a wheel speed pick-up unit configured to sense a rotational velocity of a vehicle wheel; and wherein said limit of said regenerative braking system is determined from said regenerative current, a detected fluid pressure, and a sensed wheel velocity.

19. The vehicular hybrid powertrain system of claim 15, wherein said controller is configured to at least partially disable said friction brakes and to initiate regenerative braking in response to one of an increased brake fluid pressure, an electrical brake light signal, or a throttle pedal position.

20. A regenerative vehicle powertrain system comprising:
a prime mover;
an energy storage device associated with said prime mover; and
a regenerative braking system including a controller and at least one friction brake, wherein said regenerative braking system is configured to at least partially disable said at least one friction brake during regenerative braking;

wherein said controller is configured to initially engage said friction brakes to a non-zero pressure level prior to regenerative braking and maintaining said at least one friction brake at a pressure level at least equal to said initial non-zero pressure level during regenerative braking.

21. The regenerative vehicle powertrain system of claim 20, wherein said prime mover comprises an electric motor and an inverter, wherein said regenerative braking comprises providing negative torque to said electric motor operating as a generator.

22. The regenerative vehicle powertrain system of claim 20, wherein said at least partially disabling said at least one friction brake during regenerative braking comprises:
disabling further friction braking until a limit of said regenerative braking system is met; said regenerative braking system being configured to produce a regenerative current during operation.

23. The regenerative vehicle powertrain system of claim 20, wherein said at least partially disabling said at least one friction brake during regenerative braking comprises completely disabling said at least one friction brake during regenerative braking.

* * * * *